Oct. 23, 1956     E. C. BOPF     2,767,542
PICKER BAR FOR COTTON PICKER
Filed May 10, 1955
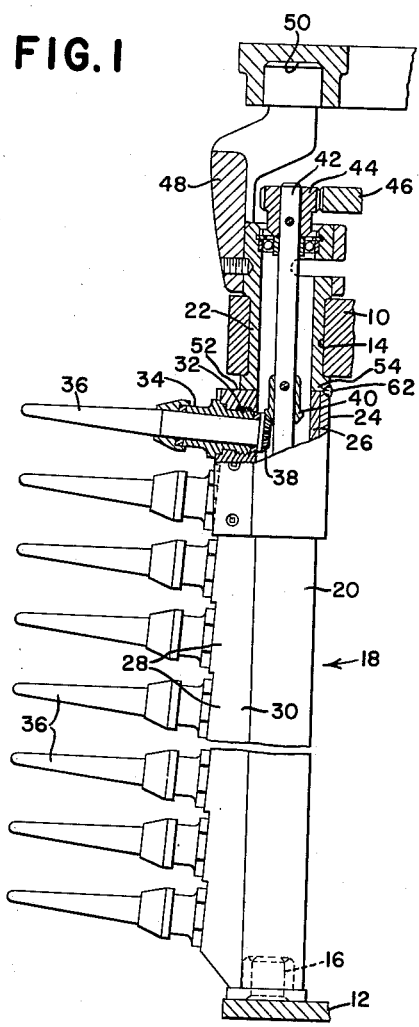
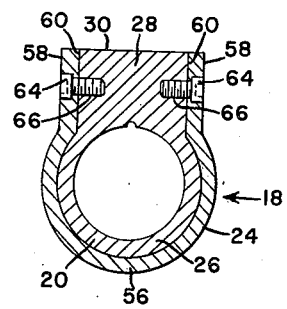
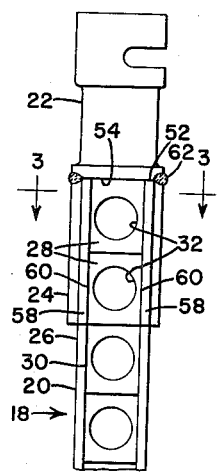
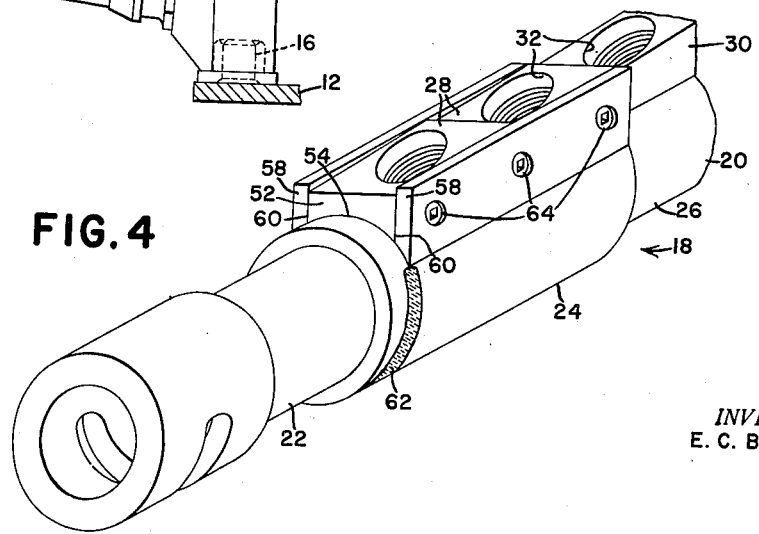
*INVENTOR.*
E. C. BOPF 2,767,542
PICKER BAR FOR COTTON PICKER Edward C. Bopf, Des Moines, Iowa, assignor to Deere Manufacturing Co., Dubuque, Iowa, a corporation of Iowa Application May 10, 1955, Serial No. 507,219

7 Claims. (Cl. 56—47)

This invention relates to a cotton picker and more particularly to an improved picker bar, a picker bar comprising one of several like bars that carry shafts for driving the cotton picker spindles.

A conventional cotton picker of the type in which the present invention finds its greatest utility comprises a cotton picker drum made up of a plurality of upright bars or columns, each of which is hollow and contains an upright driving shaft for driving a plurality of generally horizontally projecting cotton picker spindles. The nature of the construction is such that the picker bars are individually oscillated while the spindles individually rotate. For this reason, the picker bar is of relatively complicated construction which in turn means that the manufacture and production of the bars is in most cases quite expensive. It has been found, however, that there is a certain uniformity in the requirements of a picker bar, at least as concerns the shaft-containing and spindle-containing characteristics thereof, that a major portion thereof may be made as a non-ferrous extrusion. But economies realized in this respect have not heretofore been capable of exploitation, because of the difficulty of welding the non-ferrous element to the associated ferrous members. According to the present invention, these difficulties are eliminated and extremely economical picker bar construction derived by the novel utilization of ferrous and non-ferrous parts in which the ferrous parts are rigidly united as by welding and the interconnection between the ferrous and non-ferrous parts is accomplished by removable securing means. A feature of the novelty in this respect is the utilization of the picker bar in co-axial or end-to-end relationship with a head member, the picker bar comprising an elongated shaft-receiving portion and a ridge or otherwise alined plurality of spindle-receiving portions radially offset from the shaft-receiving portion, so that the ridge serves as a key with which co-operate the legs of a U-shaped mounting member that has its bight embracing the shaft-containing portion of the element. In this manner, the head can be welded to the U-shaped member and the U-shaped member will embrace the element so that the legs of the member may be readily secured to the spindle-receiving ridge.

The foregoing and other desirable features inherent in and encompassed by the invention will become apparent as a preferred embodiment of the invention is disclosed in detail in the ensuing specification and accompanying sheet of drawings, the several figures of which will be described immediately below.

Fig. 1 is an elevational view, with parts broken away and shown in section, showing the relationship between the improved picker bar and its mouting in portions of a cotton picker drum.

Fig. 2 is a front elevational view of the upper portion of the improved picker bar by itself.

Fig. 3 is a transverse sectional view, on an enlarged scale, as seen along line 3—3 of Fig. 2.

Fig. 4 is a fragmentary perspective view, on an enlarged scale, showing the upper portion of the assembled picker bar.

Those familiar with cotton pickers will recognize in Fig. 1 upper and lower picker drum portions 10 and 12, respectively, the upper portion having therein an upright bore 14 and the lower portion having an upright trunnion 16 by means of which a picker bar 18 is carried for oscillation about an upright axis. The general arrangement is conventional. However, according to the present invention, the picker bar 18 comprises three basic components: an elongated picker bar element 20, a picker bar head 22 and a mounting member 24. The element 20 itself comprises an elongated tubular shaft-receiving portion 26 with which is integrally or otherwise rigidly united a plurality of spindle-receiving portions 28, these spindle-receiving portions being in longitudinal alinement lengthwise of the portion 26. The arrangement is preferably such that the portions 28 comprise part of a lengthwise or a longitudinal ridge 30. The picker bar is preferably formed as an aluminum or otherwise non-ferrous extrusion having what may be termed a "keyhole" section (Fig. 3).

Each spindle-receiving portion 28 has therein a threaded bore 32 on an axis substantially radial to the longitudinal axis of the shaft-receiving portion 26, and each bore 32 has threaded therein a spindle bearing 34 within which is journaled a picker spindle 36 of conventional type. Each spindle has at its inner end a bevel pinion 38 and these pinions are respectively in mesh with a plurality of bevel pinions, such as that shown at 40 in Fig. 1, pinned or otherwise secured to a driving shaft 42 that extends lengthwise of the shaft-receiving portion 26 of the picker bar 18. The shaft 42 projects upwardly through the head 22 and has keyed thereto a spur pinion 44 that is in constant mesh with a driving gear 46, all of which is conventional, as is a crank 48 secured to the head 22 and following a cam track 50 for effecting oscillation of the picker bar, all as shown in the U. S. patent to Paradise 2,660,852.

Because of the journaling of the head 22 in the upper drum portion 10 at 14, it is desirable that the head 22 be of ferrous material, or other material suitable for the bearing characteristics noted. Although similar characteristics are required at the trunnion 16, these may be readily accomplished by the use of appropriate inserts. In any event, whether or not the difference between the element 20 and the head 22 is the difference between ferrous and non-ferrous materials, the type of connection between the two is novel. This connection will be described immediately below.

The upper terminal end of the picker bar element 20 is designated by the numeral 52, and the lower or element-proximate end of the head 22 bears the numeral 54. These two ends are abutted so that the head and element are in coaxial end-to-end relationship, the hollow head 22 being coaxial with the tubular shaft-receiving portion 26 of the element. As best shown in Fig. 3, the mounting member 24 is of U-shaped section, having a bight portion 56 and a pair of legs 58. The member 24 is rigidly secured to the end 54 of the head 22 as an elongation thereof and is of such length as to externally overlap the head-proximate upper portion of the picker bar element 20, the bight 56 of the member 24 embracing the external surface of the proximate shaft-receiving portion 26 and the legs 58 extending respectively alongside opposite sides of the spindle-receiving ridge 30, which sides of the ridge are appropriately flat at 60 so that there is a face-to-face contact. Union between the head 22 and the member 24 is accomplished by welding, as shown at 62. Since the legs 58 of the mounting member 24 contact the flat sides 60 of the ridge 30, there is established in effect a key that prevents relative rotation between the element 20 and the rigidly united head 22 and member 24. Axial separation between the two components just described is prevented—or assembly is accomplished—by the provision of releasable securing means, here illustrated as comprising a plurality of flush-headed screws 64 passed through the legs 56 and into appropriate tapped bores 66 in the ridge 30.

As already outlined, the novel construction here disclosed permits not only considerable economy in manufacture but enables the use of materials particularly well adapted for the special functions, that of the picker bar parts. Not only that, the ready assembly and disassembly between the element 20 and the united member 24 and head 22 permits ready replacement of either of the parts without requiring replacement of both. Still other features of the invention, not categorically enumerated herein, will occur to those versed in the art, as will many modifications and alterations in the preferred embodiment of the invention disclosed, all of which may be achieved without departing from the spirit and scope of the invention.

What is claimed is:

1. A picker bar for a cotton picker, comprising: an elongated element having lengthwise thereof a shaft-receiving tubular portion and a plurality of spindle-receiving portions alined lengthwise of the element and projecting uniformly radially from the tubular portion; a head in coaxial end-to-end relationship to one end of the tubular portion; a mounting member of U-shaped section rigidly secured to the element-proximate end of the head as an elongation thereof and externally overlapping part of said element proximate to the head, said, U-shaped member having the bight thereof embracing the shaft-receiving portion of said part of said element proximate to the head and the legs thereof lying respectively alongside and contacting opposite sides of the spindle-receiving portions of said part; and removable securing means passed through said legs and into the spindle-receiving portions of said part.

2. The invention defined in claim 1, in which: the spindle-receiving portions form a longitudinal ridge running lengthwise of and integral with the shaft-receiving portion and said ridge has opposite flat sides generally parallel to a radius of the shaft-receiving portion.

3. The invention defined in claim 1, in which: the element is of non-ferrous metal; and the head and mounting member are of ferrous metal and are of integral welded construction.

4. A picker bar for a cotton picker, comprising: an elongated element having lengthwise thereof a shaft-receiving tubular portion and a plurality of spindle-receiving portions alined lengthwise of the element and projecting uniformly radially from the tubular portion; a head in coaxial end-to-end relationship to one end of the tubular portion; a mounting member of U-shaped section rigidly secured to the element-proximate end of the head as an elongation thereof and externally overlapping a part of said element proximate to the head, said U-shaped member having the bight thereof embracing the shaft-receiving portion of the part of said element proximate to the head and the legs thereof lying respectively alongside and contacting opposite sides of the spindle-receiving portions of said part so as to prevent relative rotation between the element and the head about the lengthwise axis thereof; and removable securing means interconnecting the member and element for holding the two against lengthwise separation.

5. The invention defined in claim 4, in which: the spindle-receiving portions are integral on a longitudinal ridge running lengthwise of the shaft-receiving portion and said ridge has opposite flat sides generally parallel to a radius of the shaft-receiving portion.

6. A picker bar for a cotton picker, comprising: an elongated element having lengthwise thereof a shaft-receiving tubular portion and a plurality of spindle-receiving portions alined lengthwise of the element and projecting uniformly radially from the tubular portion; a head in coaxial end-to-end relationship to one end of the tubular portion; a mounting member rigidly secured to the element-proximate end of the head and projecting therefrom past the junction of the head and element so as to overlap part of said element proximate to the head; and removable securing means connecting the member and element.

7. The invention defined in claim 6, in which: the spindle-receiving portions are integral on a longitudinal ridge running lengthwise of the shaft-receiving portion and said ridge has opposite flat sides generally parallel to a radius of the shaft-receiving portion, and said member has portions spaced apart to lie at and contact opposite sides of said ridge.

References Cited in the file of this patent

UNITED STATES PATENTS

| | | |
|---|---|---|
| 2,533,631 | Rust | Dec. 12, 1950 |
| 2,668,409 | Bramblett | Feb. 9, 1954 |
| 2,721,436 | Hubbard | Oct. 25, 1955 |